Figure 1:
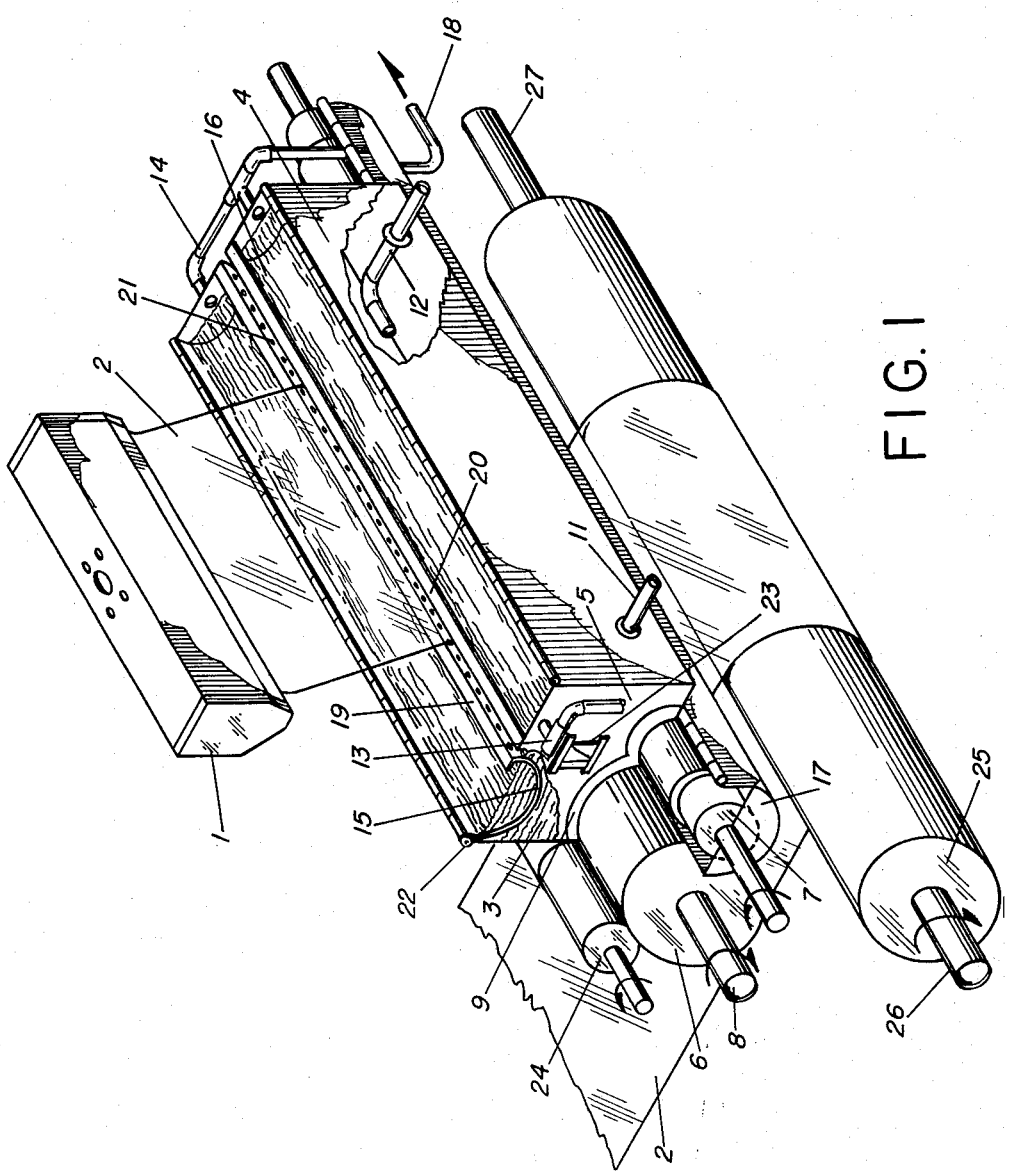

HERBERT O. CORBETT
INVENTOR.

BY E. J. Berry

United States Patent Office 3,119,151
Patented Jan. 28, 1964

3,119,151
APPARATUS FOR PRODUCING ANNEALED THERMOPLASTIC FILMS
Herbert O. Corbett, Canandaigua, N.Y., assignor to National Distillers and Chemical Corporation, New York, N.Y., a corporation of Virginia
Filed Oct. 17, 1961, Ser. No. 145,586
8 Claims. (Cl. 18—15)

The present invention relates to apparatus for producing films of thermoplastic materials. More particularly the invention relates to such apparatus wherein the techniques of quenched and cast film production are employed in combination to effect substantial improvements in the finished film.

Cast film ordinarily is produced by discharging a sheet of molten thermoplastic material from a forming die into surface contact with two or more roll elements. The molten material is passed between paired rolls rotating respectively in clockwise and counter-clockwise directions. The rolls are spaced to gauge the film, and are chilled by circulation of a heat exchange fluid therethrough.

Quenched film is produced by passing a die formed and gauged sheet of molten thermoplastic material through a quench tank filled with a quench liquid such as water. The quench liquid is maintained at a predetermined substantially constant temperature by circulation through the tank and a heat exchange system. Customarily the liquid is maintained at some temperature in the range of from about 70° F. to about 160° F., depending upon the nature or physical properties desired in the finished film.

Both cast films and quenched films exhibit very desirable properties of transparency, gloss and relative freedom from haze. The tear strength of such films is also very good, the cast film excelling in these properties.

Cast and quenched films, however, do exhibit certain deficiencies in other desirable properties. They are particularly characterized by being excessively tacky, and by having poor "handle" and "drape." While their transparency, gloss and tear strength make them desirable for use as an overwrap material, as for wrapping bread and other foods, such use is contraindicated by their deficiencies. They stick and cling to machine parts in indexing or intermittent motion wrapping machines, due to their tacky nature, and a lack of adequate unit density or stiffness. Consequently in such use these films tend to bunch, jam and tear, causing frequent film failures and defective wrappers.

It has been found that the deficiencies of quenched films may be substantially overcome by quenching at lower rates, at higher initial quenching temperatures. Low quench rates, governed by slower film travel through the quenching bath are not economically feasible. Higher quenching temperatures (above 160° F.) may result in incidental boiling of the quench liquid in contact with the hot film, thereby producing unacceptable imperfections in the film surfaces.

In order to avoid localized or incidental boiling, attempts have been made to circulate the hot quench liquid through the tanks or bath at rates up to and above twenty gallons per minute. At any point above about 7–10 gallons per minute, however, turbulence develops in the bath liquid. This turbulence usually causes repeated web breakage and distortion.

In order to produce a film having the desirable gloss, transparency, strength and haze qualities of cast or quenched films, while at the same time exhibiting superior slip qualities and unit density or stiffness, the present invention contemplates a combination quenching and casting apparatus. It is also an object of the invention to provide an apparatus for combining high temperature quenching with low temperature casting techniques, while avoiding localized boiling of the bath or quench liquid, or the web breakage or distortion produced by liquid turbulence at high liquid circulation rates.

Figure 2:
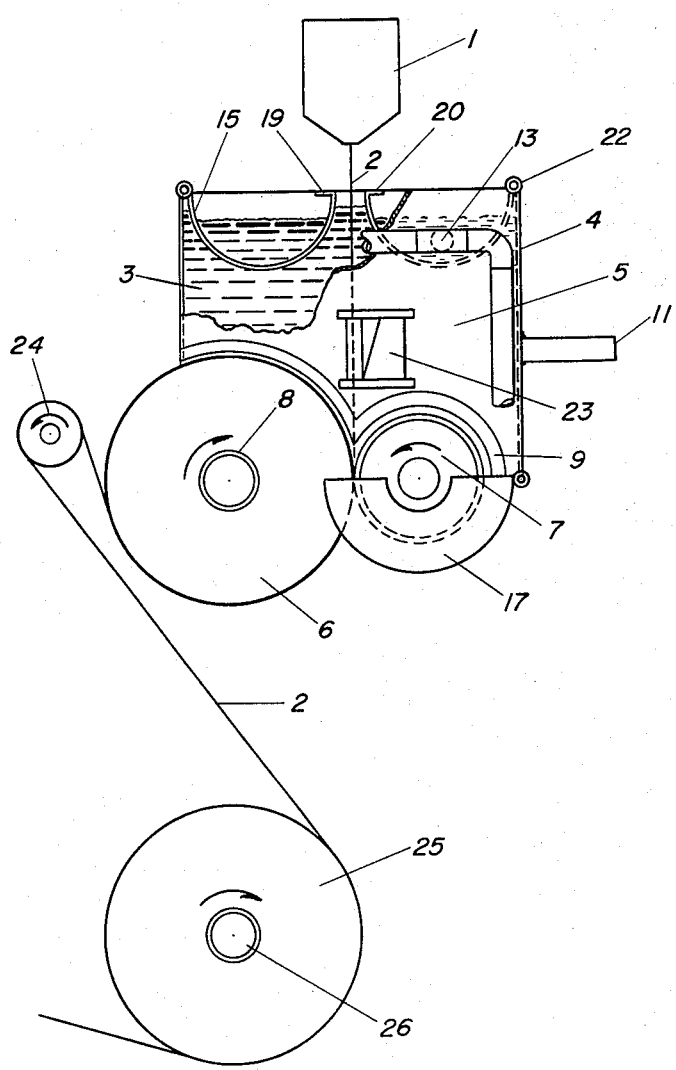

The invention and its objects may be more fully understood by reference to the following description of the accompanying drawing in which:

FIG. 1 is a perspective view of a combination quench tank and chilling roll assembly, taken from above with parts broken away and omitting conventional supports for the elements shown, as well as drive means for rotating the several roller elements contemplated, and FIG. 2 is a view in end elevation with parts broken away of the apparatus as shown in FIG. 1.

In these drawings, the numeral 1 designates an extruder head adapted for connection, in conventional fashion, to the barrel of a typical extrusion apparatus (not shown). The extruder head includes a T type die orifice of conventional design. As shown, the head and die are disposed to provide for discharge of a web of molten material 2, downwardly, into a bath of a quench liquid 3.

The quench liquid is contained in a tank formed by side wall portions 4, end wall portions 5, and a bottom formed by casting rolls 6 and 7. These rolls are disposed in axially parallel, substantially tangential relation. They are arranged and supported to permit adjustment, whereby to provide a linear orifice through which the web 2 may pass under rolling compression of the rolls. The rolls 6 and 7 also are provided to be driven (by means not shown) and rotated in respectively opposed clockwise and counter-clockwise directions relative to the flow direction of the extruded web as indicated by the directional arrows in the drawings. Preferably, the orifice established between the rolls 6 and 7 has a lateral dimension about five percent less than the gauge desired in the finished film web.

Of the two rolls 6 and 7 the roll 6 is a chill roll while the roll 7 is a nip roll. The roll 6 is a twin-shell or cored roll providing for circulation through the roll of a heat exchange fluid, such as water. The circulated fluid may be introduced and removed by way of hollow support shafts such as indicated by the numeral 8. Preferably the heat exchange fluid is circulated through the roll 6 at a temperature in the range of from about 100° F. to about 120° F. below the quench liquid temperature, and at a rate required to control the temperature gradient across the roll as closely as possible. Both the chill roll and the nip roll are provided with highly polished chrome plated surfaces, whereby to obtain the highest degree of gloss and smoothness in the finished film.

The side walls 4 and the end walls 5 are provided for sealed engagement, along their lower edges, with the related adjoining surfaces of the rolls 6 and 7. As shown, the end wall edges are formed arcuately to fit into the angular space defined between the rolls. Preferably the seal between the rolls and wall portions are formed by means of resilient, non-abrasive strips of a material having a low co-efficient of friction with the polished roll surfaces. A suitable material of this nature may be a felted packing material or even moulded seal materials such as moulded tetrafluroethylene, known as "Teflon." In the drawings the end wall seal strip is shown, and designated by the numeral 9.

The quench liquid 3 is supplied to the tank from a suitable heat exchange system not shown, as by way of conduits 11 and 12. These conduits extend through a side wall 4 of the tank and open therein at opposite ends immediately above the surface of the roll 7. Thereby the liquid is introduced at a level immediately above the effective bottom of the tank.

At the top of the tank, provision is made for withdrawal of the quench liquid by means of conduits 13 and 14, secured to and opening through the end wall 5 into communication with a pair of overflow troughs 15 and 16. The conduits 13 and 14 discharge by gravity, into a drain trough 17 which is supported below the roll 7 so as to partially enclose the roll from end to end, substantially in the manner shown. A conduit 18 may discharge the liquid to waste, or be connected to return it to the heat exchange system from which the liquid is supplied.

The overflow troughs, as shown are semicircular in cross section, and extend from end to end of the tank in parallel relation to each other, and in substantially coextensive relation to the tank side walls 4. If desired, however, these troughs may be of generally rectangular shape, providing an open top. Each of the troughs is formed to provide a lateral dimension equal to one half of the lateral dimension of the tank, minus from about one quarter to one half inch. By such dimensioning, the pair of troughs define a slot between their inner edges through which a web of molten material may be introduced into and drawn through the quench liquid bath. In a typical apparatus the slot may have an area equal to about 0.5" times the web width plus about 1.0".

The inner edges of the overflow troughs 15 and 16 also are respectively provided with inwardly turned flange portions 19 and 20 and, immediately below these flanges, are perforated to define a longitudinal series of openings, such as designated by the numeral 21, through which the quench liquid may escape from the body of the liquid within the tank.

The depth of the troughs 15 and 16 is not critical, except that each should be deep enough to accommodate a volume and weight of liquid, below the drain conduits 11 and 12, substantially sufficient to overcome the buoyant effect of the liquid displaced by the troughs below the line of perforations 21. Otherwise means may be provided to restrain the troughs and counteract their buoyancy. Preferably, the troughs are provided, at their outer edges, for hinged attachment to the upper edges of the side wall portion 4. A typical hinge is designated in the drawings by the numeral 22.

Although the withdrawal of liquid from the tank is primarily the function of the troughs 15 and 16, and the perforations 21, a constant level and overflow rate is maintained by means of a slidable weir gate 23, provided in at least one end wall 5. Liquid discharged through the weir gate falls into the trough 17.

In order to obtain a maximum contact of the quenched and cast web drawn between the rolls 6 and 7, an idler roll 24 is disposed with the axis at a level slightly above the axis of the roll 6, and substantially parallel thereto. This roll is also chrome plated, and highly polished. Preferably it is resiliently mounted in such manner as to maintain a slight tension in the web as it moves over the rotating roll 6. Also by its location the roll 24 maintains the quenched and cast web in contact with the roll 6 over about 180° of its surface. This contact surface may be increased or decreased by altering the center to center relationship of the rolls 6 and 24, and/or the relative vertical distance between horizontal planes through the respective roll axes.

In order to completely set the cast web material, a second chill roll 25 is provided. This roll is a substantial duplicate of the roll 6. It is similarly constructed to permit circulation of a heat exchange fluid therethrough, as by way of hollow bearing shafts 26 and 27, and provides a highly polished chrome plated surface for contact with the film web. Means (not shown) are provided for rotation of the roll 25 at substantially the same speed as that of the roll 6. As previously noted, arrows indicate the direction of rotation of all roll elements in the apparatus shown.

In the apparatus as shown, the rolls 6, 23 and 25 are disposed substantially to provide a maximum degree of contact of the web 2 with surfaces of the rolls 24 and 25. As noted the degree of contact of the web 2 with the roll 6 may be varied by the positioning of the roll 24. However, as the position of roll 24 is varied to increase the contact of web 2 with roll 6, contact thereof with the roll 25 will be decreased, and vice versa. To overcome this characteristic, the roll 25 may be disposed for compensating adjustment, or an additional adjustable idler roll may be positioned between the idler roll 24 and the chill roll 25.

In operation of the apparatus described, a molten web of thermoplastic materials is passed downwardly from the extruder 1, and through the orifice between the chill roll 6 and the nip roll 7. During passage between the extruder die lips and the casting rolls, the web is annealed by relatively extended contact with a heated quench liquid 3, maintained at a relatively high temperature in the quench tank, by circulation therethrough of a heat exchange liquid at a temperature above 160° F., and at a rate of from about 10 gallons per minute to about 30 gallons per minute. Circulation of the high temperature quench liquid is accomplished by way of inlet conduits 11 and 12, perforations 21, troughs 15 and 16, conduits 13 and 14, the sliding weir 23 and finally by way of the drain trough 17 and conduit 18.

The weir 23, functions to balance the liquid circulation system and more precisely to maintain the liquid level in the space or slot between the inner edges of the overflow troughs 15 and 16, whereby constant liquid overflow through the perforations 21 is accomplished. This overflow is in the immediate vicinity of contact of the molten web with the quench liquid in order substantially avoid localized boiling of the liquid. By maintaining constant overflow at this level the liquid in the web entry area is constantly replaced from the main body below the turbulence suppressing overflow troughs, and localized boiling is inhibited.

The film web leaving the chill roll 6 and 25 is passed through a pair of driven nip rolls as in conventional film forming apparatus. Thereafter, also in conventional fashion, the web may be treated, wound or otherwise handled.

What is claimed is:

1. An apparatus for forming thermoplastic films, comprising a pair of roll elements disposed in parallel, closely spaced, substantially tangential relation, said roll elements forming the bottom of a quench tank including side and end wall units wherein said units are provided and disposed for substantially fluid-tight frictional engagement with said roll elements, said side wall units extending in substantially parallel relation longitudinally thereof; means for circulating a chilled heat exchange fluid through at least one of said roll elements, means for circulating a heated heat exchange liquid through said tank, including a pair of circulating troughs supported on said side wall units in coextensive relation thereto, to extend downwardly from said side wall units into said tank, and inwardly thereof, into spaced relation longitudinally thereof; said troughs having inner opposed edge portions, each defining a longitudinal series of overflow passageways for said heated heat exchange liquid; and an extruder head disposed to discharge a web of a molten thermoplastic material through said tank and between said roll elements in a plane intermediate and coextensive with said inner trough edges.

2. An apparatus according to claim 1, wherein said circulating troughs are supported on said side wall units in hinged relation thereto.

3. An apparatus according to claim 1, wherein said means for circulating said heated heat exchange liquid through said tank also includes supply conduit means opening into said tank at a level intermediate the bottoms of said troughs and said roll elements, and liquid discharge outlets opening through at least one end wall from said troughs and from said tank.

4. An apparatus according to claim 3, wherein one said liquid discharge outlet comprises an opening defined in an end wall of said tank, and an adjustable weir-type closure therefore.

5. An apparatus according to claim 3, wherein one said liquid discharge outlet comprises a drain trough externally of said tank and a manifolded conduit connection communicating between said respective circulating troughs and said drain troughs.

6. An apparatus for forming thermoplastic films, comprising a pair of roll elements disposed in parallel, closely spaced, substantially tangential relation, said roll elements forming the bottom of a quench tank including side and end wall units wherein said units are provided and disposed for substantially fluid-tight frictional engagement with said roll elements, said side wall units extending in substantially parallel relation longitudinally thereof, and said tank being adapted to contain a body of a heated heat exchange liquid; a pair of trough elements supported on said side wall units, in coextensive relation thereto, to extend downwardly into said tank and inwardly from said side walls into spaced relation to each other and longitudinally of said tank; said troughs having inner opposed edge portions defining a narrower slot between them, and a longitudinal series of passageways defined in each of said inner opposed edge portions; means for introducing a body of a heated, heat exchange liquid into said tank and for circulating said liquid through said tank to maintain a level of liquid therein having an exposed surface area substantially defined by said slot; and an extruder head disposed to discharge a web of a molten thermoplastic material through said slot and tank, and between said roll elements in a plane intermediate and coextensive with said inner trough edge portions.

7. An apparatus according to claim 6 wherein said slot has a lateral dimension in the range of from about ½ to 1 inch, and said tank a longitudinal dimension at least 1 inch greater than the web of thermoplastic material to be passed therethrough.

8. An apparatus according to claim 6, wherein said means for circulating said heated, heat exchange liquid through said tank includes said troughs and the passageways defined in the inner edge portions thereof.

References Cited in the file of this patent

UNITED STATES PATENTS

| | | |
|---|---|---|
| 2,212,770 | Foster | Aug. 27, 1940 |
| 2,513,541 | Winegar et al. | July 4, 1950 |
| 2,534,296 | Pike et al. | Dec. 19, 1950 |
| 2,728,951 | O'Hanlon et al. | Jan. 3, 1956 |
| 3,048,895 | Bottomley | Aug. 14, 1962 |
| 3,087,198 | Edwards | Apr. 30, 1963 |
| 3,090,076 | Corbett | May 21, 1963 |